US008767871B2

(12) United States Patent
Park et al.

(10) Patent No.: US 8,767,871 B2
(45) Date of Patent: Jul. 1, 2014

(54) ANTENNA TUNING USING THE RATIO OF COMPLEX FORWARD AND REFLECTED SIGNALS

(75) Inventors: Bongseok Park, Pleasanton, CA (US); William Fujimoto, San Jose, CA (US); Sriraman Dakshinamurthy, San Jose, CA (US); Robert Lorenz, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/491,180

(22) Filed: Jun. 7, 2012

(65) Prior Publication Data

US 2013/0107914 A1 May 2, 2013

Related U.S. Application Data

(60) Provisional application No. 61/494,843, filed on Jun. 8, 2011, provisional application No. 61/611,729, filed on Mar. 16, 2012.

(51) Int. Cl.
*H04K 1/02* (2006.01)

(52) U.S. Cl.
USPC ............ 375/297; 333/17.3; 333/32; 333/124; 340/12.36; 340/538.14; 343/822; 343/852; 343/860; 379/394; 379/398

(58) Field of Classification Search
None
See application file for complete search history.

(56) References Cited

U.S. PATENT DOCUMENTS

| 6,243,566 B1 * | 6/2001 | Peckham et al. ........... 455/127.4 |
| 2012/0058739 A1 * | 3/2012 | Mckinzie et al. .......... 455/248.1 |

* cited by examiner

*Primary Examiner* — Adolf Dsouza
(74) *Attorney, Agent, or Firm* — Sterne, Kessler, Goldstein & Fox P.L.L.C.

(57) ABSTRACT

An antenna tuner is placed between a Power Amplifier (PA) and an antenna. The antenna tuner includes programmable components that can be tuned in order to effect an impedance translation between the antenna and the PA output. In an embodiment, the antenna tuner is adapted dynamically based on changes in the impedance of the antenna. In another embodiment, the antenna tuner is controlled based on measurement of the voltage reflection coefficient S11.

23 Claims, 6 Drawing Sheets

US 8,767,871 B2

ANTENNA TUNING USING THE RATIO OF COMPLEX FORWARD AND REFLECTED SIGNALS

CROSS-REFERENCE TO RELATED APPLICATIONS

The present invention claims the benefit of U.S. Provisional Application No. 61/494,843, filed Jun. 8, 2011, and U.S. Provisional Application No. 61/611,729, filed Mar. 16, 2012, both of which are incorporated herein by reference in their entireties.

BACKGROUND

1. Field of the Invention

The present invention relates generally to radio frequency (RF) transceivers.

2. Background Art

Typically, a power amplifier (PA) is designed to operate at its maximum efficiency for a known nominal load impedance, such as 50 Ohms, for example. However, when used in a wireless terminal, the PA may have to drive a load that varies in impedance over time. When impedance mismatch occurs, forward and reflected signals at the antenna feed point create a voltage standing wave. This reduces power transfer from the PA to the antenna. Conversely, the impedance mismatch at the antenna feed point also reduces the power transfer from the antenna to the receiver and degrades receiver sensitivity.

An antenna tuner is usually placed between the PA and the antenna to reduce impedance mismatch between the PA and the antenna. Conventionally, the antenna tuner is tuned by relying on instantaneous measurements made at the PA output using a power detector. Because of the broadband nature of power detectors, however, these instantaneous measurements are not very accurate (for example, they may capture power from signals being transmitted by nearby transmitters or leaking signals intended for the receiver) and typically vary drastically from one measurement to the next. As such, there is a need for improved techniques for adjusting an antenna tuner used in a wireless terminal.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Typically, a power amplifier (PA) is designed to operate at its maximum efficiency for a known nominal load impedance, such as 50 Ohms, for example. However, when used in a wireless terminal, the PA may have to drive a load that varies in impedance over time. When impedance mismatch occurs, forward and reflected signals at the antenna feed point create a voltage standing wave, This reduces power transfer from the PA to the antenna. Conversely, the impedance mismatch at the antenna feed point also reduces the power transfer from the antenna to the receiver and degrades receiver sensitivity.

Figure 1:
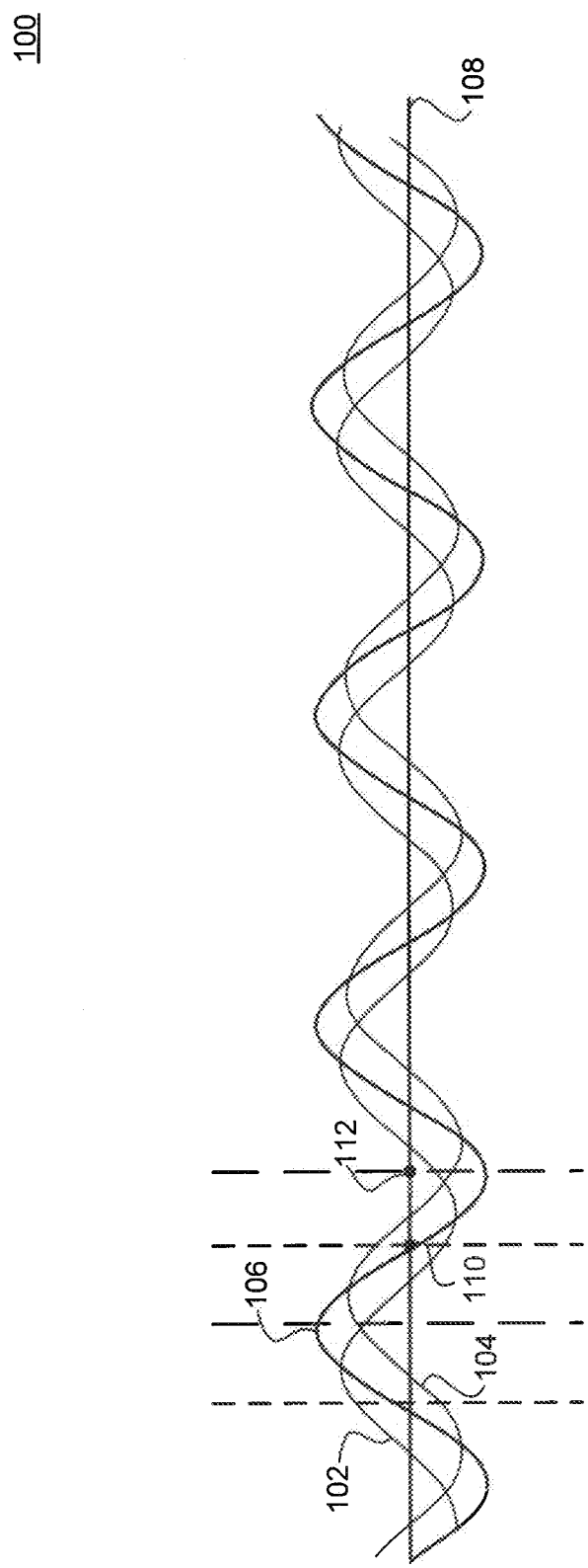
FIG. 1 is an example that illustrates the formation of a standing wave in a transmission line.

FIG. 1 is an example 100 that illustrates the formation of a standing wave 106 in a transmission line 108. As shown in FIG. 1, standing wave 106 is formed by a forward wave 102 and a reflected wave 104 combining with each other. Forward wave 102 may be the result of a voltage signal being transmitted at one end of transmission line 108. Reflected wave 104 results from forward wave 102 being reflected back due to an impedance mismatch, for example. As such, forward wave 102 and reflected wave 104 have same frequency but propagate in opposite directions in transmission line 108.

When forward wave 102 and reflected wave 104 have the same phase, they combine constructively resulting in points along transmission line 108, such as point 112, where standing wave 106 has a maximum amplitude (anti-nodes). Anti-nodes occur at equally spaced intervals ($\lambda/2$, where $\lambda$ is the wavelength) along transmission line 108. Halfway between each two anti-nodes, forward wave 102 and reflected wave 104 have opposite phase and combine destructively, resulting in points along transmission line 108, such as point 110, where standing wave 106 has a minimum amplitude (nodes). When forward wave 102 and reflected wave 104 have same amplitude (in the case of a perfect reflection), they completely cancel each other at the nodes along transmission line 108, resulting in standing wave 106 having a zero amplitude at the nodes.

The voltage standing wave ratio (VSWR) of standing wave 106 is a ratio of the amplitude at an anti-node (i.e., maximum amplitude) to the amplitude at a node (i.e., minimum amplitude) of standing wave 106. If the amplitudes of forward wave 102 and reflected wave 104 are represented by $V_f$ and $V_r$, respectively, then the VSWR can be written mathematically as:

$$\begin{aligned} VSWR &= V_{max}/V_{min} \\ &= (V_f + V_r)/(V_f - V_r) \\ &= (V_f + \rho V_f)/(V_f - \rho V_f) \\ &= ((1+\rho)V_f)/((1-\rho)V_f) \\ &= (1+\rho)/(1-\rho); \end{aligned}$$

where $\rho$ is the absolute value of the voltage reflection coefficient S11. S11 is a complex number having a magnitude component and a phase component.

In the context of a PA driving an antenna, the VSWR represents the severity of reflections at the PA output and is indicative of the quality of the impedance matching between the PA and the antenna. A VSWR of 1 represents perfect impedance matching and is achieved in the case of zero reflection (i.e., $V_r=0$). A large VSWR value, on the other hand, represents severe load mismatch at the antenna. For example, an infinite VSWR value occurs when forward wave 102 and reflected wave 104 have equal amplitude (i.e., perfect reflection), indicating zero net transfer of energy over transmission line 108. In addition to being indicative of load mismatch between the PA and the antenna, when the antenna is also used by a receiver (i.e., in a transceiver device), a high VSWR causes high insertion loss at the input of the receiver low-noise amplifier (LNA) and adversely affects the noise figure (i.e., sensitivity) of the receiver.

Embodiments of the present invention, as further described below, operate to reduce impedance mismatch between the PA and the antenna in a transceiver, thereby reducing the VSWR at the PA output and improving both the delivered power to the antenna and receiver sensitivity. In embodiments, an antenna tuner is placed between the PA and the antenna. The antenna tuner includes programmable components that can be tuned in order to effect an impedance translation between the antenna and the PA output, thereby reducing reflections seen by the PA. In an embodiment, the antenna tuner is adapted dynamically based on changes in the impedance of the antenna. Accordingly, the PA is operated very close to its optimal load impedance. In another embodiment, the antenna tuner is controlled based on measurement of the voltage reflection coefficient S11. In an embodiment, measurement of S11 is done by measuring a forward and a reverse complex gain of the transmit path of the transceiver, and estimating S11 as a ratio of the reverse complex gain to the forward complex gain of the transmit path.

Figure 2:
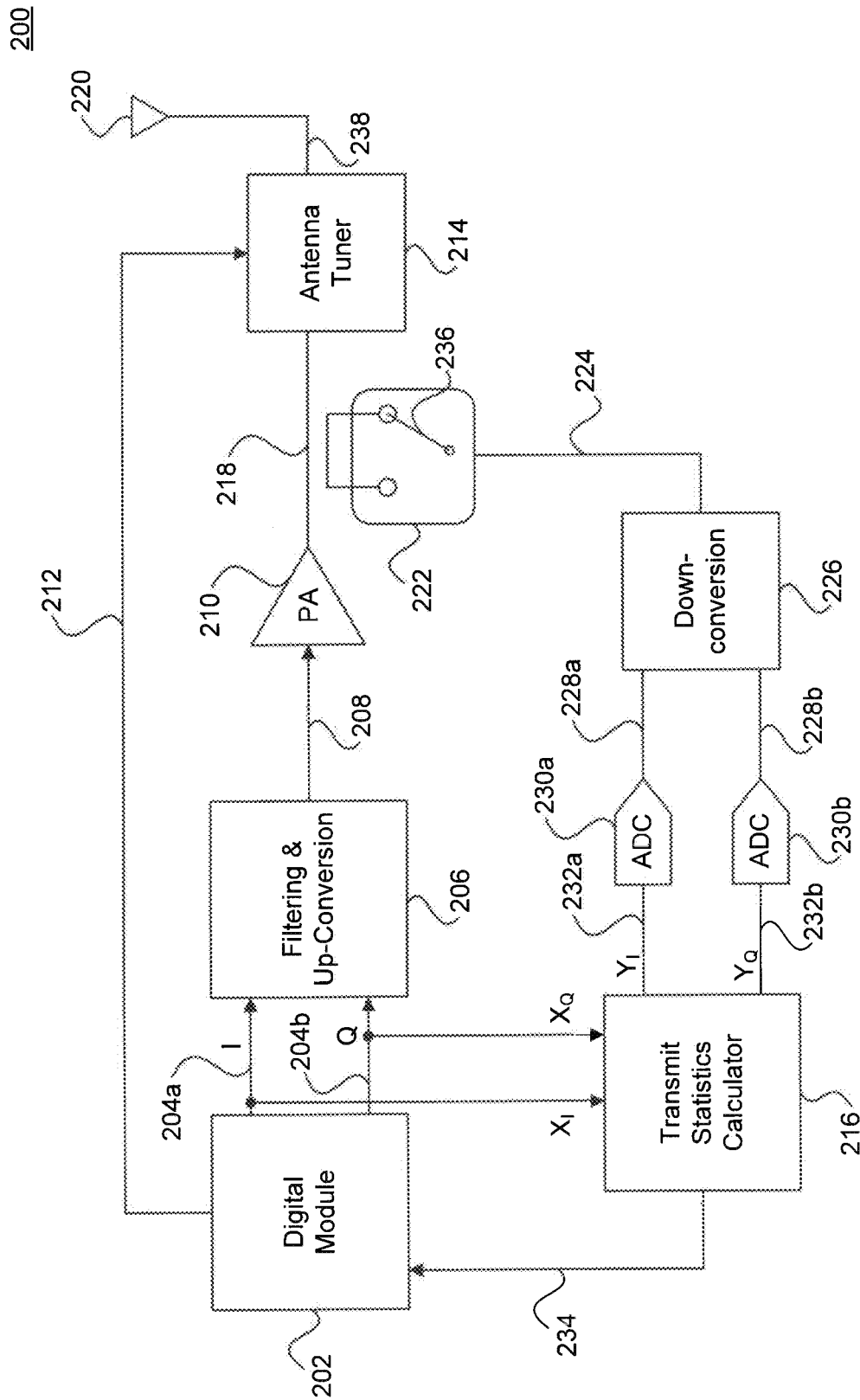
FIG. 2 illustrates an example RF transmitter according to an embodiment of the present invention.

FIG. 2 illustrates an example RF transmitter 200 according to an embodiment of the present invention. Example transmitter 200 can be used to perform embodiments of the present invention.

As shown in FIG. 2, example transmitter 200 includes a digital module 202, a filtering and up-conversion module 206, a power amplifier (PA) 210, an antenna tuner 214, an antenna 220, a directional coupler 222, a down-conversion module 226, Analog-to-Digital Converters (ADCs) 230a and 230b, and a transmit (TX) statistics calculator module 216. As would be understood by a person of skill in the art based on the teachings herein, transmitter 200 may include more components than shown in FIG. 2, which are omitted herein for the purpose of simplification. Transmitter 200 may also be integrated with a receiver that also uses antenna 220.

Digital module 202 generates in-phase (I) and quadrature-phase (Q) signals 204a and 204b based on an input signal to be transmitted. I and Q signals 204a and 204b may be digital or analog. When I and Q signals 204a and 204b are digital, digital-to-analog converters (DACs) (not shown in FIG. 2) are used to convert signals 204a and 204b to analog form before providing them to filtering and up-conversion module 206. In an embodiment, digital module 202 may pre-distort I and Q signals 204a and 204b to compensate for non-linearities in module 206 and PA 210. In embodiments, digital module 202 may be implemented using hardware and/or software components.

Filtering and up-conversion module 206 performs filtering (e.g., interpolation filtering) and frequency up-conversion on I and Q signals 204a and 204b, and then sums the resulting signals to generate RF signal 208.

PA 210 receives RF signal 208 from filtering and up-conversion module 206, and power amplifies RF signal 208 to generate an output signal 218 for transmission by antenna 220. To ensure maximum power transfer from PA 210 to antenna 220, PA 210 is designed to operate at its maximum efficiency based on a known nominal impedance (e.g., 50 Ohms) presented by antenna 220. For example, PA 210 may use back termination circuitry that is impedance-matched to the antenna impedance. As noted above, typically, during operation, the impedance presented by antenna 220 may vary over time. As such, impedance mismatch between PA 210 and antenna 220 could occur.

Antenna tuner 214, placed between PA 210 and antenna 220, serves to reduce the impedance mismatch between PA 210 and antenna 220. As shown in FIG. 2, antenna tuner 214 is controlled by digital module 202 via a control signal 212. In an embodiment, antenna tuner 214 includes programmable components that can be tuned in order to effect an impedance translation between the output of PA 210 and antenna 220. Specifically, antenna tuner 214 operates as an adjustable impedance transformer between PA 210 and antenna 220, which takes the impedance presented by antenna 220 and converts it to the nominal impedance (e.g., 50 Ohms) expected by PA 210. In an embodiment, a duplexer is placed between PA 210 and antenna tuner 214 (may be placed on either side of coupler 222).

In an embodiment, as further described below, antenna tuner is adapted dynamically by control signal 212 based on changes in the impedance of antenna 220. In another embodiment, antenna tuner 214 is controlled by control signal 212 based on measurement of the voltage reflection coefficient S11 at the output of PA 210. Because the voltage reflection coefficient S11 provides both amplitude and phase information regarding the ratio of reflected to forward waves (whereas VSWR provides only amplitude information), it allows for tuning antenna tuner 214 much more efficiently than using amplitude alone, e.g., convergence to the optimal tuning configuration based on the antenna impedance can be done in a single adjustment of antenna tuner 214.

In embodiments, control of antenna tuner 214 to reduce impedance mismatch is enabled by a feedback path, comprised of directional coupler 222, down-conversion module 226, ADCs 230a and 230b, and TX statistics calculator module 216. As further described below, the feedback path enables measurement of the voltage reflection coefficient S11 at the output of PA 210 and control of antenna tuner 214 accordingly to reduce impedance mismatch.

Directional coupler 222 is coupled to the output of PA 210 so as to receive output signal 218 of PA 210 and generate a RF signal 224. A controllable switch 236 within coupler 222 allows either a forward coupled port or a reverse coupled port of coupler 222 to be sampled. As such, directional coupler 222 can be used to measure either the forward or reflected signal components (both amplitude and phase) present in output signal 218 of PA 210.

RF signal 224 is provided to down-conversion module 226, which frequency down-converts RF signal 224 and generates baseband analog I and Q signals 228a and 228b. Signals 228a and 228b are digitized by ADCs 230a and 230b, respectively, to generate digital baseband feedback I and Q signals 232a and 232b, which are then provided to TX statistics calculator module 216. In an embodiment, feedback I and Q signals 232a and 232b are compensated, prior to being provided to TX statistics calculator module 216, so as eliminate the gain mismatch and frequency-selective effects introduced by the feedback path into the feedback signals. As such, the feedback path may further include an I/Q compensator module.

TX statistics calculator module 216 receives feedback I and Q signals 232a and 232b (which form a digital feedback signal) and corresponding I and Q signals 204a and 204b (which form a digital input reference signal). In an embodiment, I and Q signals 204a and 204b are delayed appropriately to ensure timing alignment with feedback I and Q signals 232a and 232b. TX statistics calculator module 216 correlates feedback I and Q signals 232a and 232b with I and Q signals 204a and 204 to produce a cross-correlation product between the digital feedback signal and the digital input reference signal. TX statistics calculator module 216 may also calculate an auto-correlation product of the digital input reference signal, and mean values of the digital input reference signal and the digital feedback signal over some predetermined time interval.

In an embodiment, TX statistics calculator module 216 generates the above described statistics, first with switch 236 of directional coupler 222 coupled to the forward coupled port of coupler 222, and second with switch 236 coupled to the reverse coupled port of coupler 222. As such, TX statistics calculator module 216 generates the above described statistics both with respect to the forward and reflected signal components of output signal 218 of PA 210. TX statistics calculator module 216 provides the calculated statistics (both forward and reverse) to digital module 202 via a signal 234.

Digital module 202, as further described below, uses the statistics generated by TX statistics calculator module 216 to generate estimates of the forward and reverse complex gains (denoted below as $\alpha_f$ and $\alpha_r$, respectively) of the transmit path of transmitter 200, and then estimates S11 at the output of PA 210 as the ratio of the reverse complex gain to the forward complex gain of the transmit path. Based on the estimated S11, digital module 202 adapts control signal 212 in order to adjust antenna tuner 214 accordingly. Particularly, digital module 202 adjusts antenna tuner 214 to reduce the impedance mismatch between PA 210 and antenna 220, thereby reducing reflected power from antenna 220. Because S11 provides both amplitude and phase information regarding the ratio of reflected to forward waves (whereas VSWR provides only amplitude information), antenna tuner 214 can be tuned to an optimal configuration (which minimizes impedance mismatch) very efficiently by digital module 202.

As further described below, estimation of S11 using estimates of the forward and reflected complex gains of the transmit path (which generally vary very slowly) provides an accurate and robust estimation method. Conventional methods, for example, rely on instantaneous measurements at the PA output, made typically using a power detector. Because of the broadband nature of power detectors, however, these instantaneous measurements are not very accurate (for example, they may capture power from signals being transmitted by nearby transmitters or leaking signals intended for the receiver) and typically vary drastically from one measurement to the next. Additionally, power detectors commonly have limited dynamic range and may introduce DC offsets that can negatively affect antenna tuning.

Figure 3:
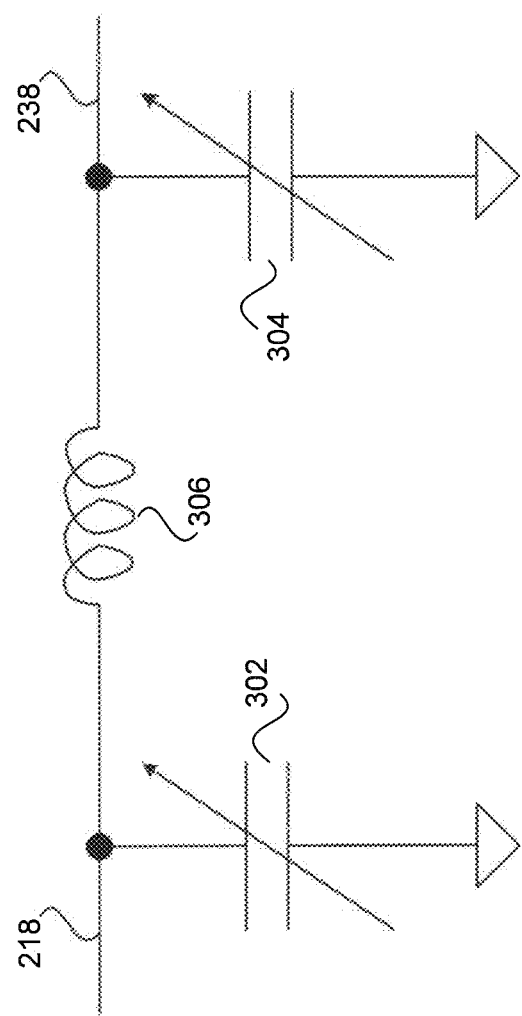
FIG. 3 illustrates an example antenna tuner according to an embodiment of the present invention.

FIG. 3 illustrates an example antenna tuner 300 according to an embodiment of the present invention. As shown in FIG. 3, one example of antenna tuner 300 includes a pi network consisting of two variable capacitors 302 and 304 and an inductor 306. Capacitors 302 and 304 may be high Q, high voltage capacitors. Capacitors 302 and 304 may also be micro-electro-mechanical system (MEMS) capacitors.

Antenna tuner 300 may be an embodiment of antenna tuner 214 of example RF transmitter 200. As such, antenna tuner 300 receives RF signal 218 from PA 210 and generates an output signal 238. Further, antenna tuner 300 may be tuned by control signal 212, which varies the capacitance values of capacitors 302 and 304 to effect an impedance translation between PA 210 and antenna 220. Specifically, control signal 212 tunes antenna tuner 300 as necessary to translate the impedance presented by antenna 220 to the nominal impedance (e.g., 50 Ohms) anticipated by PA 210. As such, PA 210 sees a load impedance of 50 Ohms, which allows PA 210 to operate at or near maximum power efficiency.

Antenna tuner 214 of example transmitter 200 is not limited to the embodiment of example tuner 300. As would be understood by a person of skill in the art based on the teachings herein, antenna tuner 214 may also be implemented using alternate circuit topologies such as a series-parallel capacitor (SPC) tuner circuit.

Figure 4:
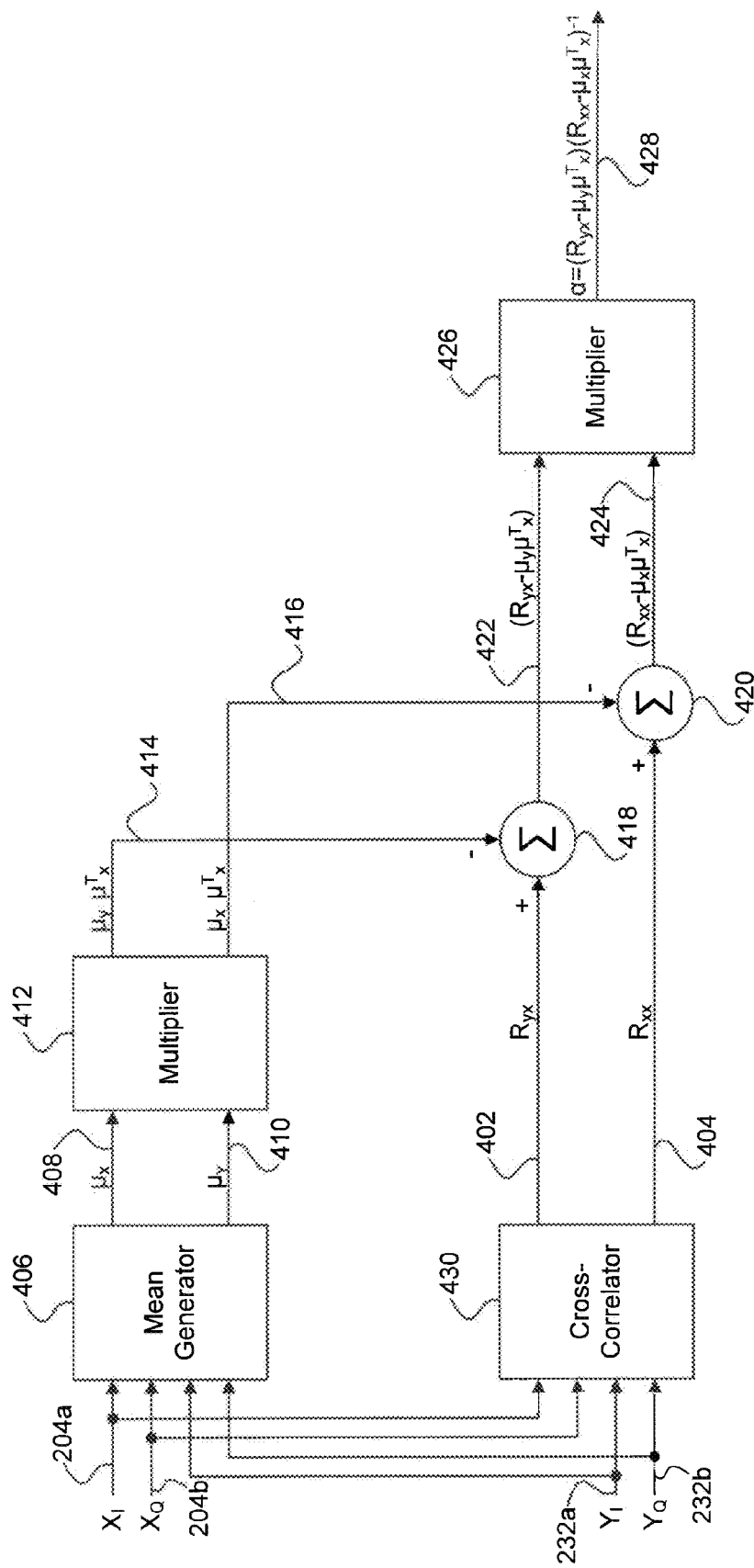
FIG. 4 illustrates an example system according to an embodiment of the present invention.

FIG. 4 illustrates an example system 400 according to an embodiment of the present invention. Example system 400 may be used to perform embodiments of the present invention, such as generating the forward and reverse complex gains $\alpha_f$ and $\alpha_r$ of the transmit path of the RF transmitter.

In an embodiment, example system 400 assumes that the feedback signal (obtained from the feedback path) is related to the input reference signal (output of the digital module) by the equation $y = \alpha \cdot x + \mu + \upsilon$, where y represents the feedback signal, x represents the input reference signal, $\alpha$ represents the forward/reverse complex gain of the transmit path, $\mu$ represents a DC offset term, and $\upsilon$ represents a noise term. As such, example system 400 estimates $\alpha$, based on this mathematical model, for both the forward and reverse gains.

As shown in FIG. 4, example system 400 includes a mean generator module 406, a first multiplier 412, a second multiplier 426, subtractors 418 and 420, and a cross-correlator module 430. Example system 400 may be integrated in its entirety within TX statistics calculator module 216. Alternatively, a portion of example system 400 may be in TX statistics calculator module 216 and another portion may be in digital module 202. For example, in an embodiment, mean generator module 406 and cross-correlator module 430 are in TX statistics calculator module 216, and the rest of the components of example system 400 are in digital module 202.

As shown in FIG. 4, example system 400 receives I and Q signals 204a and 204b (which represent the input reference signal) from digital module 202 and feedback I and Q signals 232a and 232b from the feedback path (which represent the feedback signal). In an embodiment, I and Q signals 204a and 204b are delayed appropriately to ensure timing alignment with feedback I and Q signals 232a and 232b. Feedback I and Q signals 232a and 232b may result from the measurement of either the forward or the reflected signal components present at the PA output. In an embodiment, feedback I and Q signals 232a and 232b are compensated so as eliminate the gain mismatch and frequency-selective effects added by the feedback path, so that the estimates a produced by system 400 estimate the complex gains of the transmit path only (and not of the concatenated transmit path and feedback path).

Using signals 204a-b and feedback signals 232a-b, cross-correlator module 430 generates a cross-correlation signal $R_{yx}$ 402 and an auto-correlation signal $R_{xx}$ 404, where x represents the input reference signal and y represents the feedback signal. Mathematically, if I and Q signals 204a-b and feedback I and Q signals 232a-b are represented, respectively, by the vectors $$x(k) = \begin{bmatrix} x_I(k) \\ x_Q(k) \end{bmatrix} \in \mathbb{R}^2 \text{ and } y(k) = \begin{bmatrix} y_I(k) \\ y_Q(k) \end{bmatrix} \in \mathbb{R}^2,$$

then cross-correlation signal 402 represents the matrix $R_{yx} = \sum_{i=1}^{N_{samples}} y(i) x^T(i) \in \mathbb{R}^2$ and auto-correlation signal 404 represents the matrix $R_{xx} = \sum_{i=1}^{N_{samples}} x(i) x^T(i) \in \mathbb{R}^2$, where $N_{samples}$ represents a predetermined number of samples over which the correlations are accumulated. In an embodiment, the predetermined number of samples is the equivalent of sampling one or more symbols.

Mean generator 406 generates mean signals $\mu_x$ 408 and $\mu_y$ 410, which represent respectively the mean DC offset components of the input reference signal and the feedback signal. Mathematically, $\mu_x$ 408 and $\mu_y$ 410 can be represented, respectively, by the vectors $\mu_x = \Sigma_{i=1}^{Nsamples} x(i) \in \mathbb{R}^2$ and $\mu_y = \Sigma_{i=1}^{Nsamples} y(i) \in \mathbb{R}^2$. Signals $\mu_x$ and $\mu y$ 410 are then input into first multiplier module 412, which generates signals 414 and 416. Signals 414 and 416 represent, respectively, a 2×2 cross-correlation matrix $\mu_y \mu_x^T$ and a 2×2 auto-correlation matrix $\mu_x \mu_x^T$.

Subsequently, signal 414 is subtracted from cross-correlation signal 402 using subtractor 418, to generate signal 422. Similarly, signal 416 is subtracted from auto-correlation signal 404 using subtractor 420, to generate signal 424. Mathematically, signals 422 and 424 represent, respectively, the 2×2 matrices $R_{yx} - \mu_y \mu_x^T$ and $R_{xx} - \mu_x \mu_x^T$. Subtracting signals 414 and 416 from cross-correlation signal 402 and auto-correlation signal 404, respectively, allows DC offset errors to be reduced significantly from the estimates of the complex gains of the transmit path.

Finally, signals 422 and 424 are input into second multiplier module 426, which generates output signal 428 by dividing signal 422 by signal 424. In an embodiment, multiplier 426 multiplies the matrix $R_{yx} - \mu_y \mu_x^T$ by the inverse of the matrix $R_{xx} - \mu_x \mu_x^T$ to generate an estimate a of the forward/reverse complex gain of the transmit path.

In an embodiment, example system 400 is used to generate estimates of the forward and reverse complex gains ($\alpha_f$ and $\alpha_r$, respectively) of the transmit path of transmitter 200. The $\alpha$ estimates are then used by digital module 202 to compute an estimate of S11 at the output of the PA. In an embodiment, digital module 202 estimates S11 as the ratio of the reverse complex gain to the forward complex gain $$\hat{S}_{11} = \frac{\alpha_r}{\alpha_f}.$$

Based on the estimated S11, digital module 202 adapts control signal 212 in order to adjust antenna tuner 214 accordingly. Particularly, digital module 202 adjusts antenna tuner 214 to reduce the impedance mismatch between PA 210 and antenna 220, thereby reducing reflected power from antenna 220.

Figure 5:
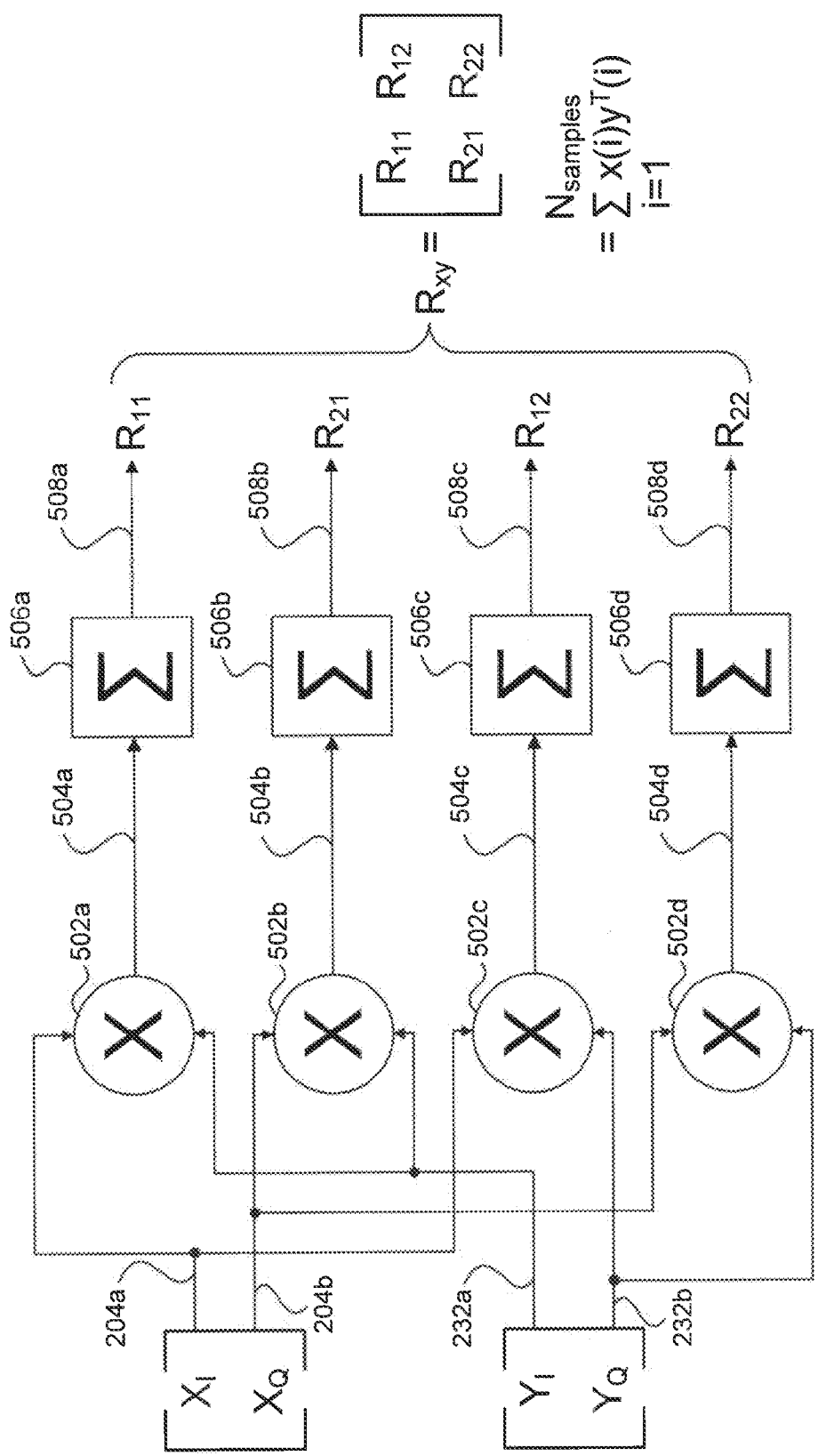
FIG. 5 illustrates an example cross-correlator according to an embodiment of the present invention.

FIG. 5 illustrates an example cross-correlator 500 according to an embodiment of the present invention. As shown in FIG. 5, cross-correlator 500 includes a plurality of multipliers 502a-d and a plurality of accumulators 506a-d.

Example cross-correlator 500 may be an embodiment of cross-correlator 430 shown in FIG. 4. As such, cross-correlator 500 receives I and Q signals 204a and 204b (which represent the digital input reference signal) from digital module 202 a nd feedback I and Q signals 232a and 232b from the feedback path (which represent the digital feedback signal). In an embodiment, I and Q signals 204a and 204b are delayed appropriately to ensure timing alignment with feedback I and Q signals 232a and 232b. Feedback I and Q signals 232a and 232b may result from the measurement of either the forward or the reflected signal components present at the PA output.

As shown in FIG. 5, cross-correlator 500 cross-correlates I and Q signals 204a and 204b with feedback I and Q signals 232a and 232b using multipliers 502a-d, to generate multiplication products 504a-d. Multiplication products 504a-d are then accumulated using accumulators 506a-d for a predetermined duration (e.g., for the duration of one or two symbols) to generate accumulator outputs 508a-d. As shown in FIG. 5, accumulator outputs 508a-d represent elements $R_{11}$, $R_{12}$, $R_{21}$, and $R_{22}$ of a cross-correlation matrix $R_{xy}$, where x represents the input reference signal and y represents the feedback signal.

As discussed above with reference to FIG. 4, cross-correlator 500 may also be used to produce an auto-correlation matrix $R_{xx}$ of the input reference signal. Accordingly, feedback I and Q signals 232a and 232b are replaced, respectively, with I and Q input signals 204a and 204b at the input of cross-correlator 500.

Figure 6:
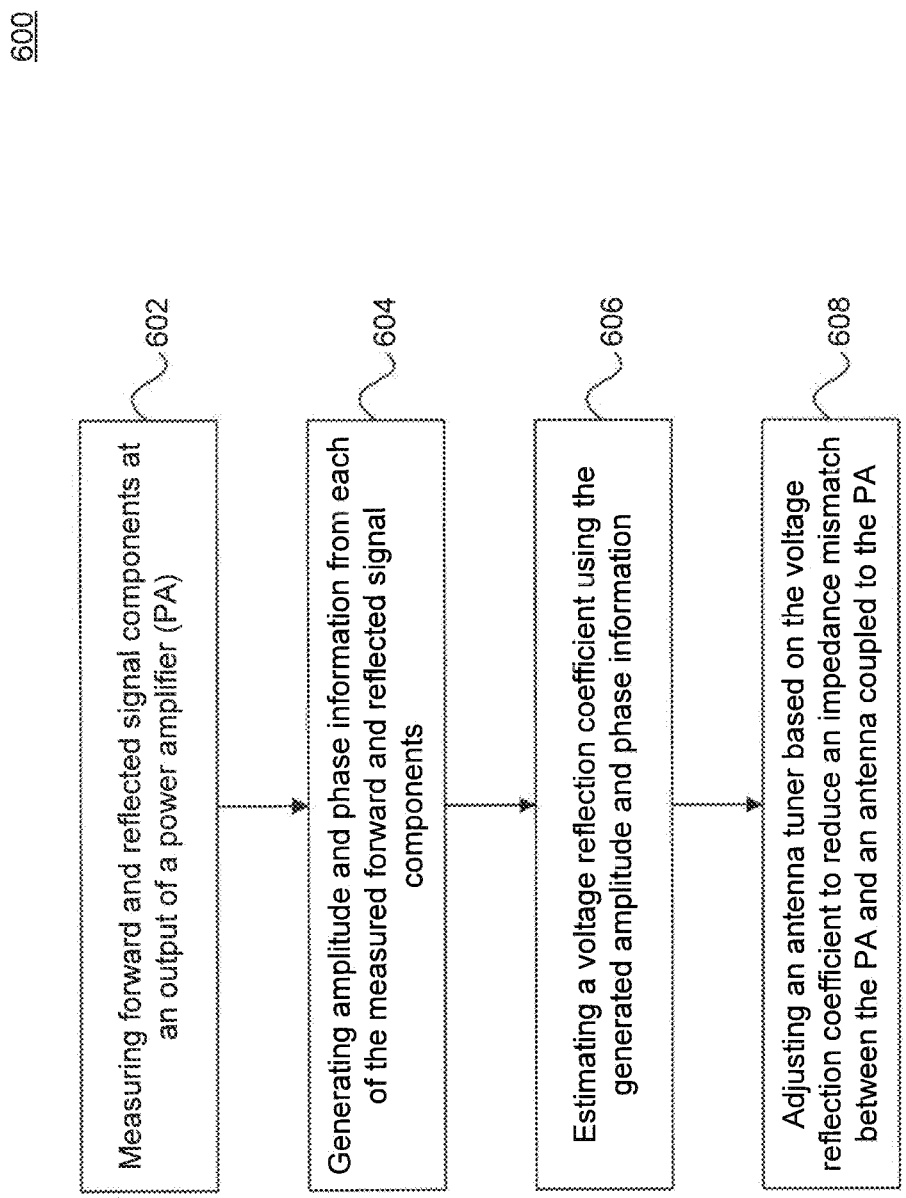
FIG. 6 is a process flowchart of a method for controlling an antenna tuner coupled between a power amplifier (PA) and an antenna, according to an embodiment of the present invention.

FIG. 6 is a process flowchart 600 of a method for controlling an antenna tuner coupled between a power amplifier (PA) and an antenna in a wireless device, according to an embodiment of the present invention.

As shown in FIG. 6, process 600 begins in step 602, which includes measuring forward and reflected signal components at an output of the PA. In an embodiment, the forward and reflected signal components result from applying an input signal to a transmit path of the wireless device. In an embodiment, the transmit path begins at an output of a digital module that produces the input signal and ends at the output of the PA. In an embodiment, step 602 further includes selectively controlling a directional coupler coupled to the output of the PA to measure the forward and reflected signal components.

Process 600 continues at step 604, which includes generating amplitude and phase information from each of the measured forward and reflected signal components. In an embodiment, step 604 farther includes separately down-converting and digitizing the forward and reflected signal components to generate respectively forward digital baseband in-phase (I) and quadrature (Q) signals and reflected digital baseband I and Q signals. In an embodiment, step 604 is performed by a feedback path of the wireless device. Step 604 may further include compensating the generated forward and reflected digital baseband I and Q signals to eliminate a gain mismatch introduced by the feedback path.

Process 600 continues at step 606, which includes estimating a voltage reflection coefficient using the generated amplitude and phase information. In an embodiment, step 606 further includes estimating a forward complex gain and a reverse complex gain of the transmit path using the input signal and the generated amplitude and phase information; and estimating the voltage reflection coefficient as a ratio of the reverse complex gain to the forward complex gain of the transmit path. In an embodiment, the voltage reflection coefficient is the input reflection coefficient, S11.

In an embodiment, estimating the forward/reverse complex gain of the transmit path includes generating a DC offset-compensated cross-correlation product between the forward/reverse digital baseband I and Q signals and the input digital baseband I and Q signals (from the input signal); generating a DC offset-compensated auto-correlation product of the input I and Q digital baseband signals; and generating the forward/reverse complex gain as a ratio of the DC offset compensated cross-correlation product to the DC offset-compensated auto-correlation product.

Process 600 terminates with step 608, which includes adjusting the antenna tuner based on the voltage reflection coefficient to reduce an impedance mismatch between the PA and the antenna. In an embodiment, step 608 includes adjusting the antenna tuner to match an impedance presented by the antenna to the PA to a target impedance value (e.g., 50 Ohms). The target impedance value is frequently 50 Ohms, but process 600 can be applied to an alternate target impedance value.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method for controlling an antenna tuner coupled between a power amplifier (PA) and an antenna in a wireless device, comprising:
    measuring forward and reflected signal components at an output of the PA, wherein the forward and reflected signal components result from applying an input signal to a transmit path of the wireless device;
    generating amplitude and phase information from each of the measured forward and reflected signal components, wherein generating the amplitude and phase information from each of the measured forward and reflected signal components comprises down-converting and digitizing the forward and reflected signal components to generate respectively forward digital baseband in-phase (I) and quadrature (Q) signals and reflected digital baseband I and Q signals;
    estimating a voltage reflection coefficient using the generated amplitude and phase information; and
    adjusting the antenna tuner based on the voltage reflection coefficient to reduce an impedance mismatch between the PA and the antenna.

2. The method of claim 1, wherein measuring the forward and reflected signal components comprises selectively controlling directional coupler coupled to the output of the PA.

3. The method of claim 1, wherein the down-converting and digitizing of the forward and reflected signal components are performed by a feedback path of the wireless device, the method further comprising:
    compensating the generated forward and reflected digital baseband I and Q signals to eliminate a gain mismatch introduced by the feedback path.

4. The method of claim 1, wherein estimating the voltage reflection coefficient using the generated amplitude and phase information comprises:
    estimating a forward complex gain and a reverse complex gain of the transmit path using the input signal and the generated amplitude and phase information; and
    estimating the voltage reflection coefficient as a ratio of the reverse complex gain to the forward complex gain of the transmit path.

5. The method of claim 4, wherein the input signal comprises input digital baseband I and Q signals, wherein estimating the forward or reverse complex gain of the transmit path comprises:
    generating a DC offset-compensated cross-correlation product between the forward or reflected digital baseband I and Q signals and the input digital baseband I and Q signals;
    generating a DC offset-compensated auto-correlation product of the input I and Q digital baseband signals; and
    generating the forward or reverse complex gain as a ratio of the DC offset-compensated cross-correlation product to the DC offset-compensated auto-correlation product.

6. The method of claim 1, wherein the antenna tuner includes a pi network having one or more variable capacitors.

7. The method of claim 1. wherein the voltage reflection coefficient is an input reflection coefficient.

8. The method of claim 1, wherein the transmit path begins at an output of a digital module that produces the input signal and ends at the output of the PA.

9. The method of claim 1. wherein adjusting the antenna tuner includes adjusting the antenna tuner to match an impedance presented by the antenna to the PA to a target impedance value.

10. A wireless device, comprising:
    a digital nodule configured to generate an input signal;
    a transmit path, comprising:
    a filtering and up-conversion module configured to generate a radio frequency (RF) signal from the input signal; and
    a power amplifier (PA) configured to power amplify the RF signal to generate an output waveform;
    an antenna configured to receive and transmit the output waveform;
    an antenna tuner coupled between the PA and the antenna; and
    a feedback path, comprising:
    a directional coupler configured to receive forward and reflected signal components at an output of the PA, wherein the forward and reflected signal components result from applying the input signal to the transmit path; and
    a RF receiver configured to generate amplitude and phase information from each of the forward and reflected signal components and further configured to down-convert and digitize the forward and reflected signal components to generate respectively forward digital baseband in-phase (I) and quadrature (Q) signals and reflected digital baseband I and Q signals;
    wherein the digital module is further configured to estimate a voltage reflection coefficient using the generated amplitude and phase information, and to adjust the antenna tuner based on the voltage reflection coefficient to reduce an impedance mismatch between the PA and the antenna.

11. The wireless device of claim 10, wherein the feedback path further comprises:
    a compensator module configured to compensate the generated forward and reflected digital baseband I and Q signals to eliminate a gain mismatch introduced by the feedback path.

12. The wireless device of claim 10, Wherein the digital module is further configured to estimate a forward complex gain and a reverse complex gain of the transmit path using the input signal and the generated amplitude and phase information.

13. The wireless device of claim 12, wherein the digital module is further configured to estimate the voltage reflection coefficient as a ratio of the reverse complex gain to the forward complex gain of the transmit path.

14. The wireless device of claim 12, wherein the input signal comprises input digital baseband I and Q signals, the wireless device further comprising:
   a TX statistics calculator module configured to generate a DC offset-compensated cross-correlation product between the forward or reflected digital baseband I and Q signals and the input digital baseband I and Q signals, and to generate a DC offset-compensated auto-correlation product of the input I and Q digital baseband signals.

15. The wireless device of claim 14, wherein the digital module is further configured to generate the forward or reverse complex gain as a ratio of the DC offset compensated cross-correlation product to the DC offset-compensated auto-correlation product.

16. The wireless device of claim 10, wherein the digital module is configured to adjust the antenna tuner based on the voltage reflection coefficient to match an impedance presented by the antenna to the PA to a target impedance value.

17. The wireless device of claim 10, wherein the antenna tuner includes a pi network having one or more variable capacitors.

18. The wireless device of claim 10, wherein the voltage refection coefficient is an input reflection coefficient.

19. A method for controlling an antenna tuner coupled between a power amplifier (PA) and an antenna in a wireless device, comprising:
   measuring forward and reflected signal components at an output of the PA to produce measurements, wherein the measurements are responsive to a phase of said forward and reflected signal components;
   estimating forward complex gain and a reverse complex gain using the measurements;
   estimating voltage reflection coefficient as a ratio of the reverse complex to the forward complex gain; and
   adjusting the antenna timer based on the voltage reflection coefficient.

20. The method of claim 19, wherein the measuring of the forward and reflected signal components is performed using a directional coupler.

21. The method of claim 19, wherein the measurements are further responsive to an amplitude of said forward and reflected signal components.

22. The method of claim 19, wherein the forward and reflected signal components result from applying an input signal to a transmit path of the wireless device, and wherein estimating the forward complex gain and the reverse complex gain comprises:
   generating a complex forward signal and a complex reflected signal from the forward signal components and the reflected signal components respectively;
   generating first and second cross-correlation products between the complex forward signal and the input signal and between the complex reflected signal and the input signal respectively;
   generating an auto-correlation product of the input signal:
   generating the forward complex gain as a ratio of the first cross-correlation product to the auto-correlation product of the input signal; and
   generating the reverse complex gain as a ratio of the second cross-correlation product to the auto-correlation product of the input signal.

23. The method of claim 19, wherein generating the complex forward signal and the complex reflected signal comprises down-converting and digitizing the forward and reflected signal components.

* * * * *

UNITED STATES PATENT AND TRADEMARK OFFICE
CERTIFICATE OF CORRECTION

Page 1 of 1

PATENT NO.         : 8,767,871 B2
APPLICATION NO.    : 13/491180
DATED              : July 1, 2014
INVENTOR(S)        : Park et al.

It is certified that error appears in the above-identified patent and that said Letters Patent is hereby corrected as shown below:

In the Claims

Column 12, line 1, please replace "estimating forward complex gain" with --estimating a forward complex gain--.

Column 12, line 3, please replace "estimating voltage reflection" with --estimating a voltage reflection--.

Column 12, line 4, please replace "complex to the forward" with --complex gain to the forward--.

Column 12, line 5, please replace "antenna timer" with --antenna tuner--.

Signed and Sealed this
Fourth Day of November, 2014

Michelle K. Lee
*Deputy Director of the United States Patent and Trademark Office*